United States Patent [19]

Pound

[11] Patent Number: 5,278,827
[45] Date of Patent: Jan. 11, 1994

[54] VARIABLE DATA RATE CHANNELS FOR DIGITAL NETWORKS

[75] Inventor: Alan Pound, Leyton Buzzard, England

[73] Assignee: British Technology Group Ltd., London, England

[21] Appl. No.: 887,021

[22] Filed: May 22, 1992

[30] Foreign Application Priority Data

May 28, 1991 [GB] United Kingdom ............... 9111405
Jul. 3, 1991 [GB] United Kingdom ............... 9114432

[51] Int. Cl.⁵ .................................................. H04J 3/22
[52] U.S. Cl. .......................................... 370/84; 370/94.2; 370/112
[58] Field of Search ............... 370/84, 112, 94.1, 94.2, 370/60, 60.1, 110.1

[56] References Cited

U.S. PATENT DOCUMENTS

| | | | |
|---|---|---|---|
| 4,553,250 | 11/1985 | Bryant . | |
| 4,577,312 | 3/1986 | Nash | 370/84 |
| 4,759,017 | 7/1988 | Allan et al. | 370/84 |
| 4,763,319 | 8/1988 | Rozenblit | 370/84 |
| 4,775,987 | 10/1988 | Miller | 375/38 |
| 4,805,167 | 2/1989 | Leslie et al. | 370/84 |

FOREIGN PATENT DOCUMENTS

| | | |
|---|---|---|
| 0080782 | 6/1983 | European Pat. Off. . |
| 0428407 | 5/1991 | European Pat. Off. . |
| 2196512 | 4/1988 | United Kingdom . |

*Primary Examiner*—Wellington Chin
*Attorney, Agent, or Firm*—Cushman, Darby & Cushman

[57] ABSTRACT

Communication channels provided by the Integrated services Digital Network (ISDN) usually carry 64 Kbits/sec in each direction and are therefore unsuitable for data traffic at higher rates. This difficulty can be overcome by assembling ISDN channels to form channels having a higher bit rate. However problems arise, for example, in the transmission of data packets where the bit-rate required changes frequently and therefore the number of channels grouped together must be changed often. These problems are tackled as now described. Data from different data streams to be transmitted is read into respective buffers in a RAM. ISDN channels are grouped into channels known as slots and U-channels, respectively, and each U-channel transmits a respective data stream. Data from the buffers are assembled into frames, corresponding to an ISDN frame in a frame store by a microprocessor. Information controlling how the data is assembled in the frame store is held by a slot control RAM and respective control portions of the RAM. Conventional ISDN circuits take frames from the store for transmission and fill a receive frame store on reception from other stations in the ISDN. The RAM takes account of any "skew" due to differential delays in different ISDN channels in reading out from the frame store into receive buffers. When a U-channel is to be expanded, without interruption of the existing slots in the U-channel, by the addition of another slot, a first distinctive synchronizing packet is transmitted which indicates the U-channel to which the new slot is to belong. When this packet has been acknowledged a second distinctive synchronizing packet is transmitted which carries a time reference for calculating skew and then data is sent in the new slot in the next frame. When the bit-rate for a U-channel falls one of the slots of that U-channel can be closed by transmitting a distinctive closing packet in that slot. On reception of this packet that slot is deleted in the next frame.

16 Claims, 4 Drawing Sheets

VARIABLE DATA RATE CHANNELS FOR DIGITAL NETWORKS

The resent invention relates to the provision of channels for digital networks, for example the Integrated Services Digital Network (ISDN), with bit rates which are both higher than the usual data-carrying channels of the networks and also variable.

The ISDN has been defined by the International Telegraph and Telephone Consultative Committee (CCITT) and the standards that have been recommended are based on the assumption that voice data, that is telephony, is one of the most important types of traffic that will be carried on the network. The standard means of converting an analogue voice signal to digital form is to sample the signal 8000 times per second, with each sample consisting of 8 bits of data. Thus the usual data-carrying channel in ISDN is a bidirectional channel carrying 64 Kbits/sec in each direction.

A "Primary Rate" bearer channel (the carrier) operating at 2048 Kbits/sec is also defined. This type of channel might be used for connecting a private 'branch' exchange to the network and it is time division multiplexed into 32 sub-channels. Time division frames are made up of 32 octets of data, one octet (8 bits) from each sub-channel, and are sent in a continuous stream. In this specification the 32 positions in the time frame are called "slots". In each frame the first slot is used to identify the start of frame and another (known as the D channel) is reserved for providing the network with routing instructions. The remaining 30 slots (known as the B channels) may be used for data or digitised voice.

The primary rate channel carries 8000 frames per second and thus in order to send a 64 Kbits/sec signal through the system, it is split up into octets which are inserted into the same slot of successive frames.

A different ISDN is used in the USA where although 8000 frames per second are employed, a frame consists of 24 slots plus one start bit, giving a primary rate of 1544 Kbits/sec.

The data in a particular slot passes from its source to its destination through the network via one or more switching centres. At each of these centres data from any particular slot is extracted and placed in another slot in a frame travelling along the route to the destination. Octets placed in the same slot in successive frames leaving the source travel through the network in exactly the same fashion and arrive successively as the octets of a given slot in the frames arriving at the destination. However, the slot position within the carrier frame at the destination will not in general be the same as the slot position at the transmitter.

A disadvantage of the ISDN as described above, is that it is unsuitable for data traffic at higher rates than 64 Kbits/sec. This problem can be overcome to some extent by the system described in PCT Patent Specification WO 85/04300 where a group of 64 Kbits/sec data channels are assembled to form a channel having a higher bit-rate. The delay in each channel is monitored and then equalising delays are added in the channels so that data distributed in sequence over the channels on transmission is assembled in the same sequence on reception. However the system relies on setting up the group of channels as a whole and cannot be changed without being completely reset.

Where the high bit-rate channel is to be used for the transmission of data packets the bit-rate required between locations is likely to change frequently and therefore the number of channels grouped together must be changed often.

In this specification a bit-synchronised digital data network is a network which provides transmission channels between two, or any two of three or more, locations at predetermined bit-rates, each channel being established before transmission, and not by reference to information transmitted in the channel. The network maintains a frequency that is the same for all channels and is synchronised between all channels. Within one period of this frequency a channel which is carrying data accepts a predetermined number of bits at one location and delivers the same number of bits at another location.

The proposed ISDN standards define a network of this type in which the said frequency is 8-kilohertz and for this reason is said to have 8-kilohertz integrity. For two channels in a bit-synchronised digital data network having the same end-points the signal delay across the network may be different for the two channels, but, in any given number of periods of the basic frequency, exactly the same number of bits are delivered on the two channels.

British Patent No. 2,196,512 and U.S. Pat. No. 4,805,167 describe methods and apparatus for use with an ISDN in which a variable number of slots are combined together to provide channels, known as U-channels, which have bit rates higher than those of the ISDN slots, these bit rates being variable by varying the number of slots combined to form one U-channel. The number of slots in any U-channel is varied as required by traffic requirements without interrupting traffic in the U-channel by the use of synchronisation signals which are transmitted by a U-channel at regular intervals. The synchronisation signals are used to signal the opening or closing of slots in a U-channel and to provide synchronisation for data in a new slot. However such an arrangement has the disadvantage that the overall data carrying capacity of the channels forming a U-channel is reduced by the regular transmission of synchronisation signals and in addition problems may occur in the synchronisation of ISDN circuits which employ the U-channel technique.

According to a first aspect of the present invention there is provided a method of transmitting high bit-rate signals having a variable bit-rate including the steps of dividing a digital input signal having a bit-rate higher than a predetermined bit-rate into a sequence of subordinate digital signals having data rates equal to or less than the said predetermined bit-rate, transmitting the subordinate digital signals using a group of transmission channels with each subordinate signal transmitted by a respective channel, the channels in the group each being capable of handling the said predetermined bit-rate, receiving the transmitted signals, assembling the received subordinate signals to provide an output signal in which the sequence of data bits is the same as that of the input signal, and changing, from time to time, the number of the said transmission channels making up the said group while continuing to transmit subordinate signals along those channels of the said group which are not changed, wherein when the number of channels in the said group is to be increased, signals are transmitted which specify the time at which a subordinate signal will be first transmitted in one of the said channels to be added to the group, and when the received subordinate signals are assembled, the said time is used in correctly providing the said sequence.

Preferably, when the number of channels in the said group is to be increased signals are transmitted which specify the group to which a new channel belongs for use when assembling the subordinate signals when more than one such group exists.

The said channels may be slots of an ISDN and the channels are then duplex.

To reduce the number of channels in the group, when first and second stations are coupled by an ISDN, a distinctive predetermined sequence of digital signals may be transmitted from the first station which then ceases to transmit a subordinate signal in one of the channels in a predetermined frame (usually the next frame). When the predetermined distinctive sequence is received at the second station, any signals received in the said one channel are omitted from the said output signal as from a predetermined frame (usually the next frame).

Transmitting the time at which a new channel comes into operation, and using the predetermined sequence to close channels, allows the regular transmission of synchronisation signals to be omitted. The predetermined distinctive sequence should preferably be one which is not likely to occur more than, for example, once in a hundred or a thousand years or more of traffic at the normal rate. This sequence can be sent in any ISDN frame and each slot of each group, that is a U-channel, is examined at the receiving end for the presence of the predetermined sequence.

The predetermined sequence is specially chosen so that it is unlikely to occur in practice, and preferably has 64 bytes so that the probability of this sequence occurring in normal traffic is extremely low. In the remainder of this specification, but not the claims, the predetermined sequence is referred to as a "special distinctive closing packet".

At first sight it would be expected that the sending of the predetermined sequence would reduce the bit-rate of the U-channel (that is the second channel) but although strictly speaking such a reduction occurs it does not present a problem since when a slot is removed from a U-channel it is because the bit-rate of the U-channel is to be reduced.

According to a second embodiment of the invention there is provided apparatus for use in transmitting and receiving high bit-rate digital signals comprising a transmitter having means for dividing a digital input signal having a bit-rate higher than a predetermined bit-rate into a sequence of subordinate digital signals having data rates equal to or less than the said predetermined bit-rate, and means for transmitting the subordinate digital signals by way of a group of transmission channels, each channel being capable of handling the said predetermined bit-rate, with each subordinate signal transmitted by a respective channel, and a receiver having means for receiving the transmitted signals, and means for assembling the received subordinate signals to provide an output signal in which the sequence of data bits is the same as that of the input signal, the apparatus including means for changing, from time to time, the number of the said transmission channels making up the said group while continuing to transmit subordinate signals along those channels of the said group which are not changed, the means for changing the number of transmission channels including, in the transmitter, means for transmitting, when the number of channels in the said group is to be increased, signals which specify the time at which a subordinate signal will be first transmitted in one of the said channels to be added to the group, and the means for assembling the received subordinate signals being arranged to use the said time in correctly providing the said sequence.

Preferably the various means of the second aspect of the invention are formed by a programmed computer, such as a microprocessor and/or personal computer (PC).

The invention will now be described by way of example with reference to type accompanying drawings, in which.

Figure 1:
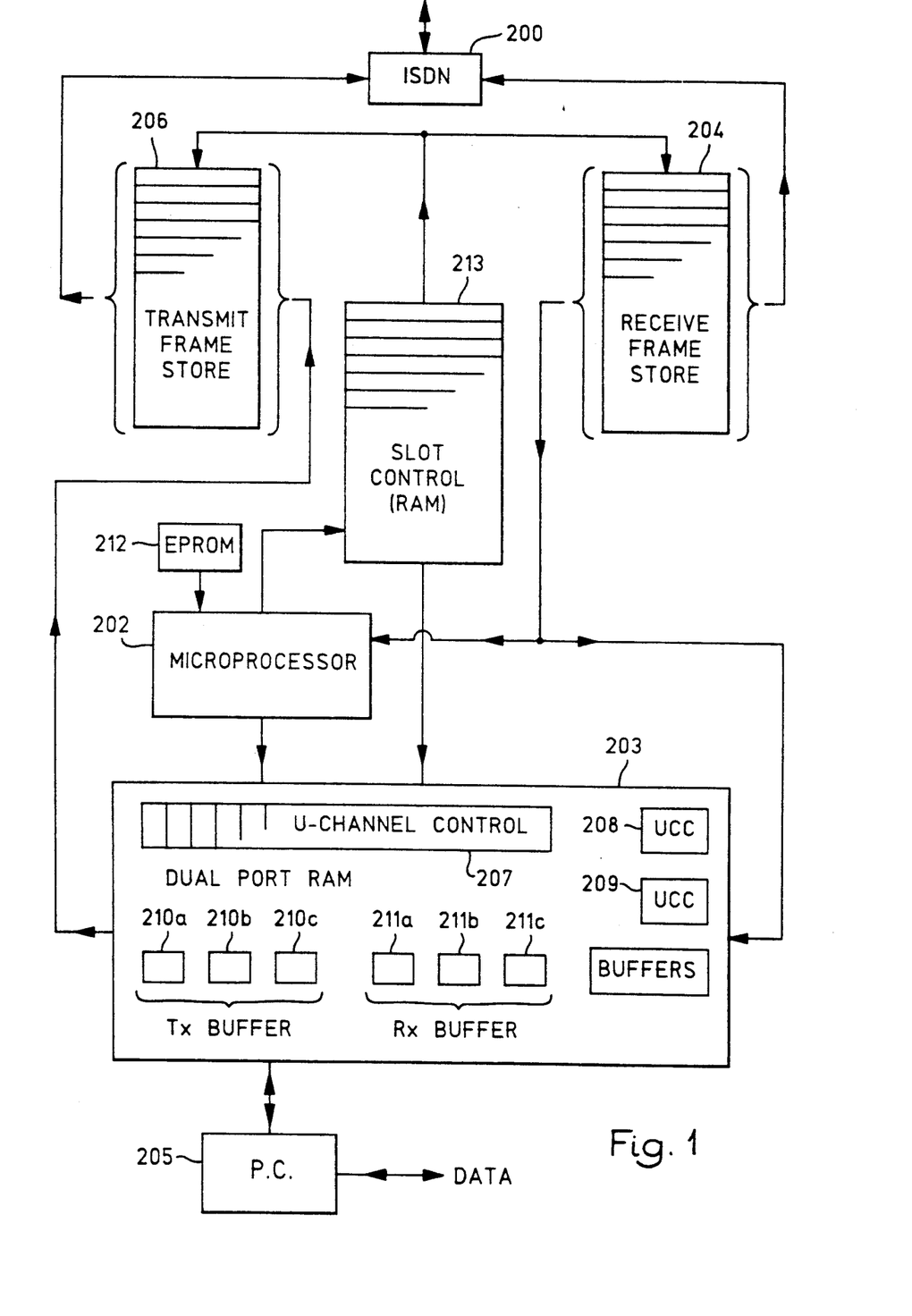
FIG. 1 is a block diagram including apparatus of an embodiment of the second aspect of the invention.

In FIG. 1 a PC 205 receives data from, for example, a local area network or a video codex. The resulting bit stream is to be transmitted by one or more U-channels over an ISDN with each U-channel formed by a group of ISDN slots. The PC 205 in conjunction with a microprocessor 202 sets up a number of control blocks in a dual port RAM 203 with one such block for each U-channel. Examples of these blocks are shown at 207 to 209 but in practice many more such blocks may be used. Information held by such a U-channel control block includes the destination of the U-channel, the number of ISDN slots required and the session number (that is a designation number for that U-channel). In addition each such block contains information designating six portions of the RAM 203, three of which form a transmit buffer for that U-channel and the other three forming a receive buffer. The transmit and receive buffers for the U-channel control block 207 are shown at 210a, 210b and 210c, and 211a, 211b and 211c, respectively.

The microprocessor 202 which may for example be an Intel 80960CA RISC processor, under the control of a program, preferably written in assembly language in order to give sufficient speed of operation for real time response (which is, of course, essential) and stored in an electrically programmable read-only memory (EPROM) 212 uses a RAM 213 for slot control in that it is used in controlling the transfer of data, in 8-bit octets, from the transmit buffers of the dual port RAM 203 to a transmit frame store 206. Each B slot in an ISDN frame is allocated a separate portion of the RAM 213.

A number of frames ready for ISDN transmission are held by the frame store 206 and they are read out in turn under the control of the microprocessor 202 using pointers to different frame locations in the store, the pointers being incremented each time a frame is read out. When all the frames in the store have been read out, pointer incrementation reverts to the beginning of the store so that frames are read out cyclically. The transmit frame store 206 is connected to commercially available ISDN circuits 200 which are connected to the ISDN network.

The same procedure of cycling through the frame store locations is carried out when data is transferred from the dual port RAM 203 to the frame store 206.

Slots in a frame store location are filled at a point several frame locations behind the location being transmitted to the ISDN. The microprocessor 202 cycles through the portions for each slot of the RAM 213. Each of these portions contains data specifying the slot to be filled and a pointer to the appropriate U-channel control 207 to 209. This U-channel control contains data specifying a pointer to the next part of the buffer to be read out, for example part of the buffer 210a to 210c, so that the slot whose portion of the RAM 213 is used by the microprocessor 202 is filled by data from the appropriate buffer in the dual port RAM 203. When the buffer pointer in the U-channel control 207 reaches the end of one of the portions 210a, 210b and 210c, the control 207 signals the PC 205 to refill this portion with data. A wrap-round arrangement of pointers is used so that after the portion 210c has been read out to the transmit frame store 206 the next portion to be read out is the portion 210a, and these portions are filled in the same wrap-round cyclic fashion. The other transmit buffers are operated in the same way.

At times insufficient data may be received on a particular U-channel and although this could be considered as an error condition it is preferable to transmit a pattern that can be identified as not being data and can then be discarded on reception. A variation on a special closing pack-et, described below, is used for this purpose.

ISDN incoming signals having been processed by the ISDN circuits 200 are read into a receive frame store 204 under the control of a pointer which is incremented after each frame is read. Successive frames are entered into successive locations until the last location store is reached when the pointer is incremented to indicate the first location so that this store also is used in a wrap-round fashion.

The receive frame store 204 must be large enough to accommodate the greatest possible frame skew (N frames) which can occur due to different delays experienced in the ISDN by slots transmitted in the same ISDN frame. For this purpose the receive frame store 204 is sufficient to accommodate $2 \times N$ frames plus some additional margin for system latency (M frames).

Data is read from slots in the frame store at two points: a first point very near to the location where a frame has just been entered into the store as indicated by an incremented pointer and a second point, as indicated by a skew calculation described below, approximately half-way between the most recent and oldest frame held in the store. Data from the first point is used for the signals which are required for changing the number of slots in a U-channel while data from the second point is transferred under control of the contents of the RAM 213 to the receive buffers in the dual port RAM 203. In addition to its use for changing the number of slots in a U-channel the information supplied from the first location to the microprocessor is used to calculate skew.

As each slot is read out in the second position reference is made by the microprocessor 202 to the appropriate portion of the slot control RAM 213 which specifies which U-channel the slot belongs to and hence the U-channel control portion 207 to 209 which specifies the receive buffer to which data is to be transferred and the location in that buffer which is to receive data. In addition the slot control portion contains skew information so that data can be read from the correct frame location in the store 204. Additionally when a new slot is added to a U-channel information from, or just before, the second point is used to locate the arrival of the SYNC2 packet so that the start of received data can be located.

Figure 2:
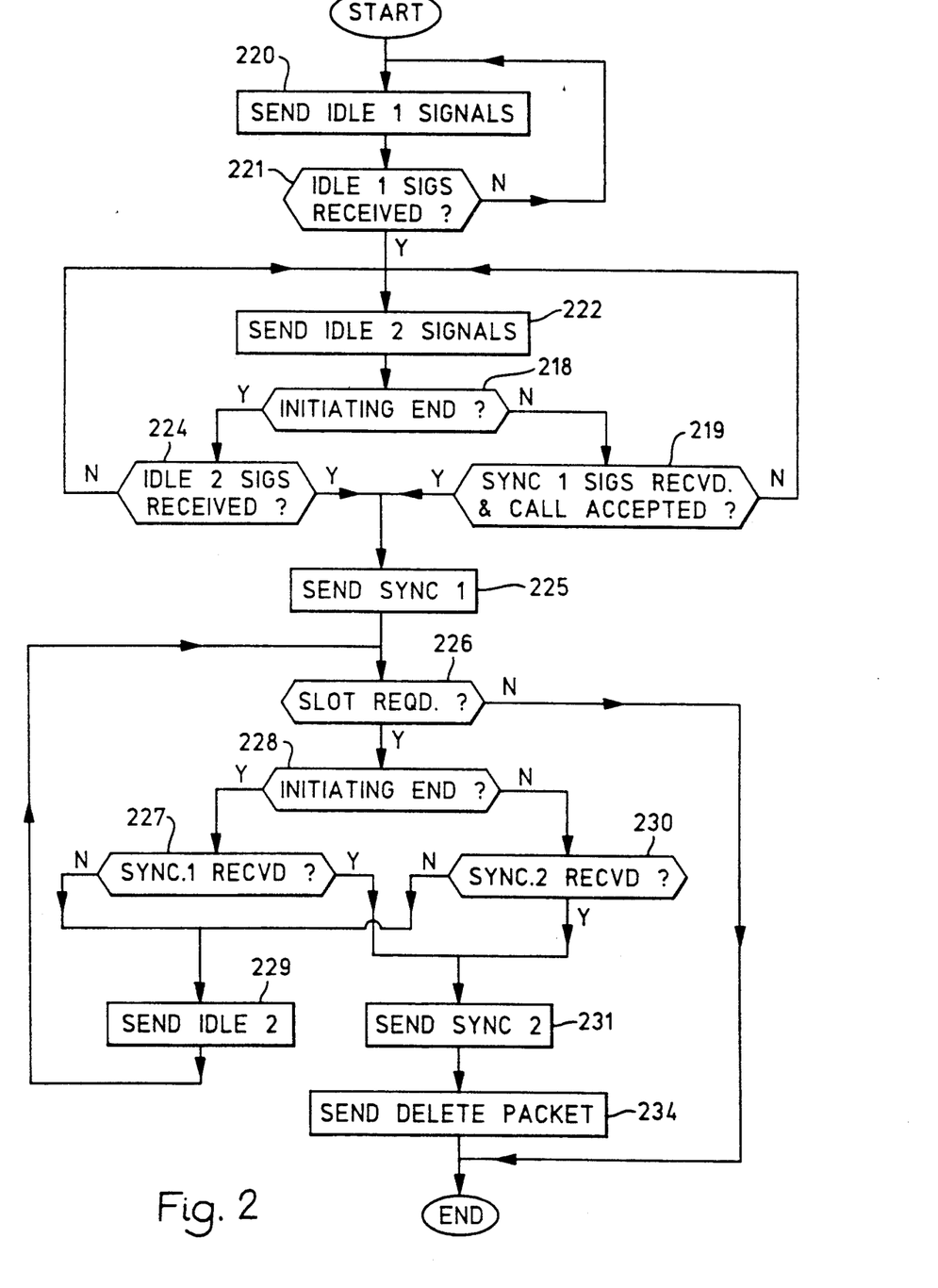
FIGS. 2, 3 and 4 are flow diagrams used in explaining the operation of the microprocessor 202 of FIG. 1.
Figure 3:
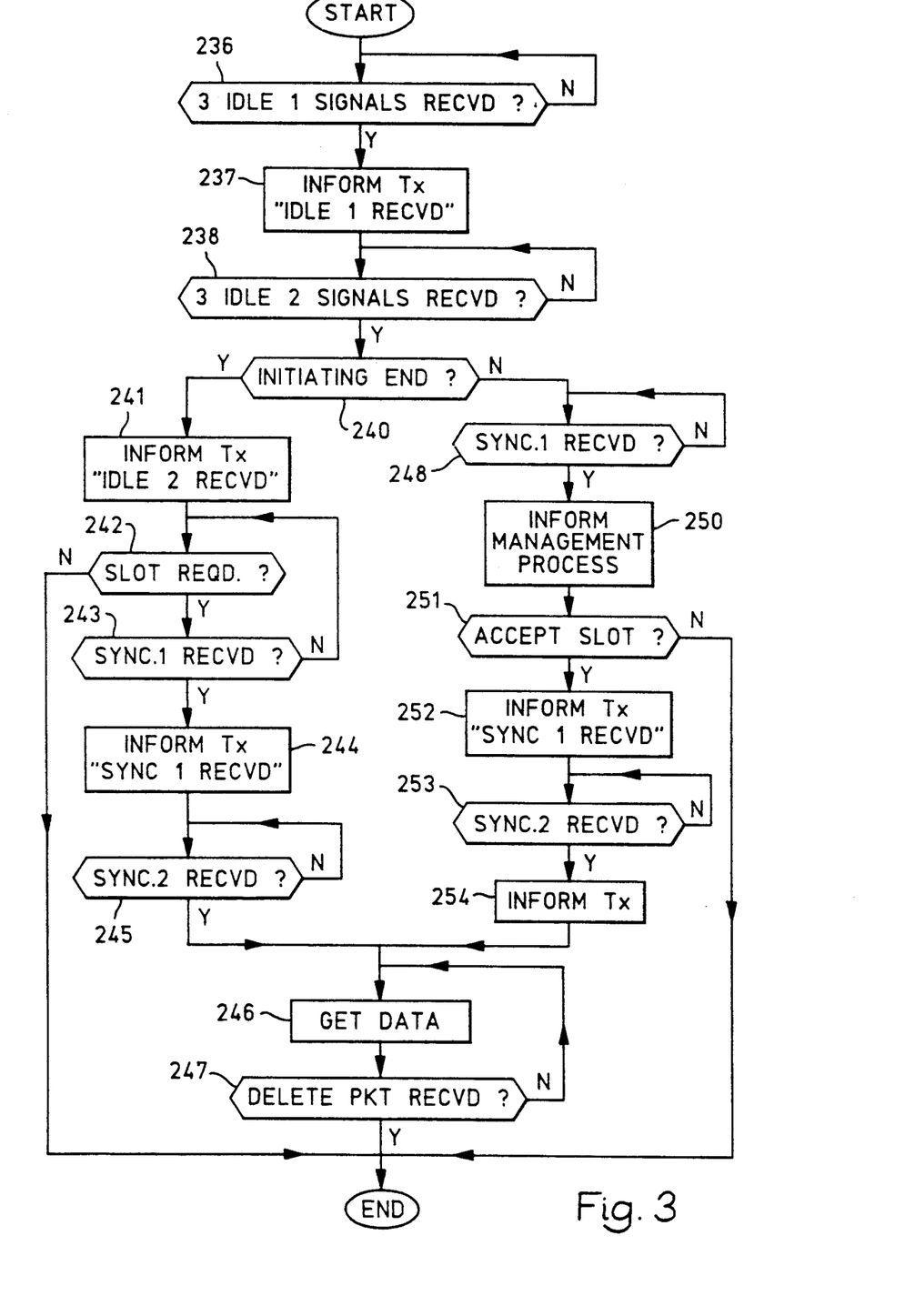
Figure 4:
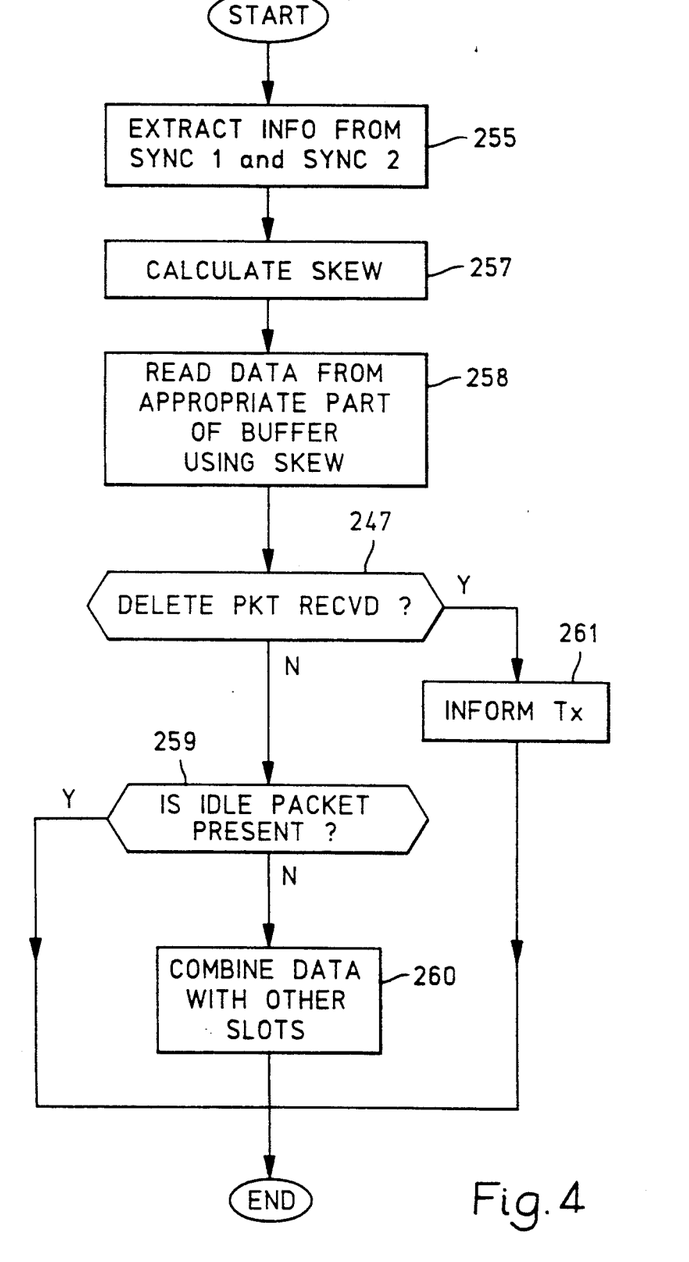

The operation of setting up the U-channels is first described briefly and then in more detail with reference to FIGS. 2, 3 and 4.

When off line, each slot of an ISDN transmits an idle data value (IDLE0) required by the ISDN service. When the local ISDN exchange has indicated to the circuits 200 that a slot connection has been made, equipment at each slot end proceeds to transmit a different value (IDLE1) and when equipment at an end receives the IDLE1 value, it alters its transmission to another value (IDLE2). Thus, when an end has received the IDLE2 value it is clear that the other end is receiving its transmission and it is receiving the transmission from the other end.

In this embodiment U-channels are opened and closed one slot at a time and when a new slot is to be opened a "packet" of data (SYNC1) is transmitted in the new slot after the IDLE2 value has been received. The SYNC1 packet consists of three initial arbitrary characters (chosen to be unlike the IDLE values, and unlike a SYNC2 packet, described below) followed by characters indicating the U-channel number, time order of slots within the U-channel at the transmitting end, the mode of communication employed, two further characters having no fixed significance at present and a checksum. In this embodiment of the invention the microprocessor 202 at each end stores each U-channel number so that when a new slot is added and the SYNC1 signal is received the new slot is recognised as potentially part of an existing U-channel. Various possible modes of communication allow for different delays in the reception of slots due to, for example, short or long haul connections (for instance by land line or satellite connection). The mode of communication may also indicate whether the data is packeted or transmitted as a continuous data stream and whether error correction is included.

Data synchronisation is achieved by the SYNC2 packet which consists of three initial characters unlike the IDLE values and SYNC1 followed by three characters carrying a time reference which is used to calculate the frame timing skew to allow for different delays experienced in the ISDN system by slots sent in the same transmit frame. The time reference value (TF) is followed by a checksum to validate it and then immediately in the next frame a data stream in the new slot as part of the U-channel which has just been joined by this slot.

Slots are also closed down one at a time and for this purpose a special 64-byte distinctive closing packet is sent, preferably, in this embodiment, in the slot to be closed. The microprocessor 202 is programmed to detect the special closing packet in any slot of a U-channel and this is carried out by bringing a subroutine into operation whenever a certain character which occurs at the beginning of the packet, usually a little used control character, is detected. If the packet starts with this special character and contains all the other characters of the closing packet then the slot in question is immediately deleted in the next frame from the U-channel so that no more data from this slot is included as part of the output of the U-channel. As an alternative the special closure packet can be sent in any part of the U-channel containing the slot to be closed when the number of the slot to be closed is sent after the closing packet. When the apparatus of FIG. 1 first establishes connection to an ISDN, a frame counter forming part of the software for the microprocessor 202 is started and incremented each time an ISDN frame is received. The counter has a number of bits allowing a count value greater than the greatest possible frame skew. This number is preferably 32 bits but could be reduced to 16 bits in most circumstances. The counters of two different equipments of the type shown in FIG. 1 will almost always not have the same count value but whilst running they will always maintain precisely the same difference because they are both locked to the ISDN network clock.

A slot may experience more or less delay than other slots transmitted in the same U-channel in the same frame, due to having followed a different route through the ISDN. Thus slots transmitted in one frame may arrive in a spread of frames and it is necessary to calculate relative delay between frames so that U-channel data can be assembled in the correct order.

If the frame counters at a remote end and a local end of a slot have frame counts of RTF and LTF, respectively, then the difference between the counters (REF) is given by $$REF = RTF - LTF.$$

When SYNC2 is received for the first slot to be received in a U-channel, TF is read by the receiving slot end processor 202 and REF is calculated and stored. As SYNC2 arrives in slots received later, TF is extracted at the first reading point and stored as S_RTF when the value of the local frame counter is also stored as S_LTF.

In order to transfer data from the frame store 204 to the receive buffers of the dual port RAM 203, data is nominally read from the store 204 at a frame location which is a particular number of frames (approximately half the total number of frame locations) behind the location which has just been filled by received data from the ISDN. The frame location actually read depends on the skew for the slot being read and if the said particular number of frame locations corresponds to a nominal frame delay (NOM_FRAME_DELAY), then the location to be read is calculated from this value plus the difference between the times of transmission (S_RTF) and receipt (S_LTF) but allowance also has to be made for the difference between the remote and local frame counters (REF). Thus the position of the frame to be read in the store 204 relative to the frame location which has just been filled by the ISDN is calculated by the processor 20 for each slot in a U-channel as given by $$S\_FRAME\_DELAY = NOM\_FRAME\_DELAY - (REF - (S\_RTF\_S\_LTF))$$

Once this offset has been calculated it is stored in the appropriate slot control location in the RAM 13 so that it can be used each time this RAM is traversed to read out a frame and transfer data to the appropriate U-channel buffers.

Although it may be decided at a calling end of a U-channel that the bit-rate should be changed by the addition or subtraction of a new slot, it may be that at the receive end circumstances are such that such a change in bit-rate cannot be accepted. This situation is taken into account in the flow diagram of FIG. 3 where the end which does not initiate the request for a new slot is able to accept or reject the request.

In the flow diagram of FIG. 2 operations carried out by the transmit procedure of the second embodiment of the system are shown. When the ISDN exchange has indicated that a slot connection has been made the transmit procedure of the system sends a predetermined number of IDLE1 signals and then a test 221 is carried out to determine whether the receiver coupled to the slot has received IDLE1 signals. If not the predetermined number of IDLE1 signals is transmitted again but if IDLE1 signals have been received then a predetermined number of IDLE2 signals is transmitted in an operation 222. Next, either a test 224 determines whether IDLE2 signals have been received on that slot, if, as indicated by a condition 218, the procedure is being carried out at the slot end initiating the new slot, or if not a test 219 indicates whether SYNC1 signals have been received and the call is accepted (see below). If neither test is positive a jump occurs back to operation 222 so that IDLE2 signals can be sent again but otherwise SYNC1 signals are transmitted (operation 225).

After a further test 226 to check that the new slot is still required, a test 227 is carried out by the transmitting procedure at the end of the slot at which the call was initiated as indicated by a condition 228. If the test 227 indicates that the SYNC1 signal has not been received then an IDEL2 signal is sent and a jump occurs back to the test 226 so that further IDLE2 signals continue to be sent until a SYNC1 signal is received, or if a slot is not accepted at the other end and SYNC1 signals are not sent for this reason (see below), the test 226 indicates that the slot is not required. At the end at which the new slot was not initiated (as indicated by the condition 228) a test 230 is carried out to determine whether the SYNC2 signal has been received and this signal is not transmitted from the other end until the SYNC1 signal has been received there. If not then the operation 229 to send an IDLE2 signal is carried out followed by a jump back to the test 226 so that IDLE2 signals continue to be sent until the SYNC2 signal is received.

When the SYNC1 signal is received at the end initiating the call or the SYNC2 signal is received at the other end then the SYNC2 signal is transmitted in an operation 231. Thus the end initiating the call sends SYNC2 when it receives SYNC1 which means that the other end has accepted the new slot, and the end not initiating sends SYNC2 when it receives SYNC2 from the other end. Data is now entered into the transmit frame store 206, in the way described above, as part of a U-channel in the next frame (operation 232) until no further data is to be sent by this particular slot when the special delete packet is sent (operation 234). It will be realised that the various signals IDLE1, IDLE2, SYNC1 and SYNC2 are entered into appropriate frames in the store 206 by the microprocessor 202. The procedure of FIG. 2 is terminated if, as indicated by the test 226, the new slot is no longer required.

The receive procedure of the flow chart of FIG. 3 begins with a test 236 to determine whether three IDLE1 signals have been received. This test is continuously carried out until such signals are received when a signal is sent to the transmit procedure indicating that the IDLE1 signals have been received (operation 237). The receive procedure then seeks three IDLE2 signals in a test 238 and when such signals are received at the end initiating the slot connection (as indicated by a condition 240), the transmit side is informed that the IDLE2 signals have been received (operation 241). Provided the new slot is still required (test 242) the receive side now seeks the arrival of the SYNC1 signal as indicated by a test 243. If this signal is not received it may be an indication that the non-initiating end will not accept the new slot (see a test 251 and an operation 252, described below, and the operation 225). If so then the result of the test 242 will become negative and a jump to the "END" will occur. Usually the SYNC1 signal will be received and then the transmit side is informed in an operation 244 and a test 245 is carried out to determine the arrival of a SYNC2 signal. After such a signal has been received data is taken from the slot as part of a U-channel in an operation 246 until a delete packet is received as indicated by a test 247.

Reverting to the condition 240, if the slot is not at the end initiating the slot, then a test 248 is carried out to detect the arrival of the SYNC1 signal when an operation 250 is used to inform a management process (operation 250). The management process may or may not be prepared to accept a further slot for an existing U-channel or a new U-channel. However, if it is decided to accept the new slot as indicated by a test 251 then the transmit side is informed that SYNC1 has been received in an operation 252. A test 253 is used to indicate the arrival of SYNC2 and when this occurs the transmit side is informed in an operation 254 and from the next frame on data is received in the slot as part of a U-channel (the operation 246) until a delete packet arrives as indicated by the test 247.

FIG. 4 is a flow diagram showing the operation 246 in more detail. When the first frame containing a newly opened slot is received in the receive frame store, an operation 255 is carried out to extract information at the first reading point for the slot control portions of the RAM 213, this information being contained by SYNC1 (U-channel number of the slot and time order of slots) and SYNC2 (TF). The microprocessor 202 then calculates the skew of that slot (operation 257) in the way described above from the frame count at the receiver at the time SYNC2 was read out, and the information extracted from SYNC1 and SYNC2, and the skew is stored in the appropriate portion of the RAM 213. Next data from the slot which is held by the receive buffer is read at the second reading point using the calculated skew (operation 258). The test 247 (also shown in FIG. 3) is then carried out and if the delete packet is not present a test 259 determines whether an IDLE packet is present. If not the data read is combined with data from other slots in the U-channel in the way described above using data in the RAM 213 and the control blocks 207 to 209. If the delete packet is present the transmit side is informed in an operation 261 when it also sends the delete packet in the next frame.

It will be clear that the invention can be put into operation in many different ways apart from those specifically described above. Clearly other synchronisation patterns and other configurations of computer hardware and algorithms can be used.

The invention may be used with any bit-synchronised digital data network not simply an ISDN as specifically described. Suitable networks are not necessarily time multiplexed and subordinate signals may be transmitted on channels in any order.

I claim:

1. A method of transmitting high bit-rate signals having a variable bit-rate including the steps of dividing a digital input signal having a bit-rate higher than a predetermined bit-rate into a sequence of subordinate digital signals having data rates equal to or less than the said predetermined bit-rate, transmitting the subordinate digital signals using a group of transmission channels with each subordinate signal transmitted by a respective channel, the channels in the group each being capable of handling the said predetermined bit-rate, receiving the transmitted signals;

assembling the received subordinate signals to provide an output signal in which the sequence of data bits is the same as that of the input signal, changing, from time to time, the number of the said transmission channels making up the said group while continuing to transmit subordinate signals along those channels of the said group which are not changed, transmitting signals which specify the time at which one of said subordinate signals is first transmitted in one of the said channels to be added to the group when the number of channels in the said group is to be increased, and using said time to correctly provide said sequence when the received subordinate signals are assembled.

2. A method according to claim 1 wherein when the number of channels in the said group is to be increased, signals are transmitted which specify the group to which a new channel belongs for use when assembling the subordinate signals when more than one such group exists.

3. A method according to claim 2 wherein the channels are the duplex sub-channels of an ISDN system and are transmitted in a series of frames, and the signals which specify the time and those which specify the group are transmitted by way of the group of channels which is to be increased.

4. A method according to claim 3 wherein when the number of channels in the said group is to be increased, signals are transmitted which specify the order of channels in each frame in which signals in the group are transmitted.

5. A method according to claim 3 wherein data is transmitted between first and second stations using the channels, counts are kept of the number of ISDN frames transmitted and received, respectively, and the time at which one of said subordinate signals is first transmitted is specified by means of the frame counts.

6. A method according to claim 5 wherein assembling the received subordinate signals includes storing at least as many frames of received signals as the maximum expected frame delay, for each subordinate signal transmitted in one of said ISDN frames, calculating the stored frame in which that subordinate signal currently appears, and selecting signals from the stored frames calculated to assemble the output signal in receive frames which correspond respectively to the transmitted frames.

7. A method according to claim 4 wherein the number of channels in the group is reduced, when required, by transmitting, in the group, a predetermined distinctive sequence of digital signals from one of the stations ceasing to transmit one of said subordinate signals in one of the channels in a frame having a predetermined relationship to the frame in which the predetermined distinctive sequence is transmitted, detecting the predetermined distinctive sequence at the other station, and at the said other station, omitting any signals received in the said one channel from the said output signal as from a frame having the said predetermined relationship to the frame in which the predetermined distinctive sequence is detected.

8. A method according to claim 5 wherein when the number of channels in the said group is to be increased and two way communication has been established over an additional channel, a first synchronising predetermined sequence of digital signals is transmitted over the additional channel from that one of the stations which initiates the use of the additional channel, it is determined at the non-initiating station, on reception of the first synchronising sequence whether the new channel is to be accepted and if so the first synchronising sequence is transmitted over the additional channel to the initiating station, on reception of the first synchronising sequence at the initiating station, a second synchronising predetermined sequence of digital signals is transmitted over the additional channel to the non-initiating station followed by a digital signal specifying the frame count at the initiating station and in the next frame a first portion of a new one of the said subordinate signals, and on reception of the second synchronising sequence at the non-initiating station, the second sequence is transmitted over the additional channel to the initiating station followed by a digital signal specifying the frame count at the non-initiating station and in the next frame a first portion of a new one of the said subordinate signals.

9. A method according to claim 8 wherein each said first synchronising sequence is followed by the signals specifying the group as part of a packet of digital signals which includes the first synchronising sequence.

10. A method according to claim 8 wherein assembling the received subordinate signals includes storing at least as many frames of received signals as the maximum expected frame delay, for each subordinate signal transmitted in a single frame, calculating the stored frame in which that subordinate signal currently appears, and selecting signals from the stored frames calculated to assemble the output signal in receive frames which correspond respectively to the transmitted frames, and wherein calculating the stored frame in which a subordinate signal currently appears is carried out using the following equation:

Frame Delay = Nominal Frame Delay-(REV-(SRTF-SLTF))

where

Frame Delay = frame position in the frame store relative to the position of a frame in which the most recent subordinate signals to be received are stored, Nominal Frame Delay = frame position in the store chosen as the nominal position for read out, REF = the difference between the frame counts at the initiating station and at the non-initiating station when a frame containing the second synchronising signal of the first subordinate signal to be received of the group containing the subordinate signal whose frame position is to be calculated was transmitted and received, respectively, and SRTF-SLTF = the difference between the frame counts at the initiating station and at the non-initiating station when a frame containing the second synchronising signal of the subordinate signal whose frame position is to be calculated was transmitted and received, respectively.

11. Apparatus for use in transmitting and receiving high bit-rate digital signals comprising a transmitter having means for dividing a digital input signal having a bit-rate higher than a predetermined bit-rate into a sequence of subordinate digital signals having data rates equal to or less than the said predetermined bit-rate, and means for transmitting the subordinate digital signals by way of a group of transmission channels, each channel being capable of handling the said predetermined bit-rate, with each subordinate signal transmitted by a respective channel, and a receiver having means for receiving the transmitted signals, and means for assembling the received subordinate signals to provide an output signal in which the sequence of data bits is the same as that of the input signal, the apparatus including means for changing, from time to time, the number of the said transmission channels making up the said group while continuing to transmit subordinate signals along those channels of the said group which are not changed, the means for changing the number of transmission channels including, in the transmitter, means for transmitting, when the number of channels in the said group is to be increased, signals which specify the time at which one of said subordinate signals will be first transmitted in one of the said channels to be added to the group, and the means for assembling the received subordinate signals being arranged to use the said time in correctly providing the said sequence.

12. Apparatus according to claim 11 wherein the means for transmitting is arranged to transmit, when the number of channels in the said group is to be increased, signals which specify the group to which a new channel belongs for use by the means for assembling where more than one such group exists.

13. Apparatus according to claim 12 wherein the channels are the duplex sub-channels of an ISDN system and are transmitted in a series of frames, and the signals which specify the time and those which specify the group are transmitted by way of the group of channels which is to be increased.

14. Apparatus according to claim 13 wherein the transmitter and the receiver each comprise a frame counter or counting ISDN frames and the said time at which one of said subordinate signals is first transmitted is specified by means of the contents of the frame counter at the transmitter.

15. Apparatus according to claim 14 wherein the means for assembly includes a frame store for storing at least as many frames of received signals as the maximum expected frame delay, means for calculating, in relation to each subordinate signal transmitted in one of said ISDN frames, the position in the frame store of that subordinate signal, and means for selecting signals according to the calculated positions and for assembling the selected signals to form the output signal in receive frames corresponding to respective transmit frames.

16. Apparatus according to claim 12 wherein at least one of the said means are formed by a single computer.

* * * * *